United States Patent
McAlpine et al.

(10) Patent No.: US 6,807,347 B2
(45) Date of Patent: Oct. 19, 2004

(54) HIGH DENSITY FIBER OPTIC CABLE

(75) Inventors: Warren W. McAlpine, Hickory, NC (US); Richard S. Wagman, Hickory, NC (US); William C. Hurley, Hickory, NC (US); James L. Baucom, Conover, NC (US); Scott A. McDowell, Connelly Springs, NC (US)

(73) Assignee: Corning Cable Systems LLC, Hickory, NC (US)

( * ) Notice: Subject to any disclaimer, the term of this patent is extended or adjusted under 35 U.S.C. 154(b) by 268 days.

(21) Appl. No.: 09/888,773

(22) Filed: Jun. 25, 2001

(65) Prior Publication Data

US 2002/0197030 A1 Dec. 26, 2002

(51) Int. Cl.$^7$ .................................................. G02B 6/44
(52) U.S. Cl. ...................................... 385/103; 385/102
(58) Field of Search .................................. 385/103, 102

(56) References Cited

U.S. PATENT DOCUMENTS

| | | | |
|---|---|---|---|
| 3,644,866 A | 2/1972 | Deardurff | 338/214 |
| 4,009,513 A | 3/1977 | Andersen | 28/72.6 |
| 4,223,520 A | 9/1980 | Whitted et al. | 57/350 |
| 4,725,453 A | * 2/1988 | Nakasone et al. | 427/163.2 |
| 5,054,174 A | 10/1991 | Krenzer | 28/271 |
| 5,067,830 A | 11/1991 | McAlpine et al. | 385/114 |
| 5,142,754 A | 9/1992 | Krenzer | 28/271 |
| 5,165,003 A | * 11/1992 | Carter | 385/112 |
| 5,184,381 A | * 2/1993 | Coons et al. | 28/271 |
| 5,268,971 A | * 12/1993 | Nilsson et al. | 385/101 |
| 5,293,443 A | 3/1994 | Eoll et al. | 385/114 |
| 5,345,526 A | 9/1994 | Blew | 385/112 |
| 5,379,363 A | 1/1995 | Bonicel et al. | 385/114 |
| 5,422,973 A | 6/1995 | Ferguson et al. | 385/112 |
| 5,590,447 A | 1/1997 | Goineau | 28/172.1 |
| 5,751,879 A | 5/1998 | Graham et al. | 385/103 |
| 5,763,076 A | 6/1998 | Coons, III et al. | 428/364 |
| 5,838,864 A | 11/1998 | Patel et al. | 385/113 |
| 6,088,499 A | * 7/2000 | Newton et al. | 385/112 |
| 6,167,178 A | 12/2000 | Navé | 385/103 |
| 6,185,352 B1 | 2/2001 | Hurley | 385/114 |
| 6,321,012 B1 | * 11/2001 | Shen | 385/106 |
| 6,482,512 B1 | * 11/2002 | Schwartz | 428/364 |
| 6,574,400 B1 | * 6/2003 | Lail | 385/109 |

FOREIGN PATENT DOCUMENTS

| | | | |
|---|---|---|---|
| DE | 3913674 A1 | 10/1990 | G02B/6/44 |
| DE | 4004721 A1 | 8/1991 | D02G/1/16 |
| DE | 19546773 A1 | 12/1995 | H01B/13/26 |
| EP | 0553990 A1 | 8/1993 | G02B/6/44 |
| EP | 0762171 A1 | 3/1997 | G02B/6/44 |

OTHER PUBLICATIONS

Hoechst Celanese Corporation, *Man–made Fiber and Textile Dictionary*, 1988, pp. 34–34, 40–41, 56–59, 138–143.
Siemens Product Information, *Zig Zag Binder CSM 24™, The Future of Binding*, 1999.

* cited by examiner

Primary Examiner—Hae Moon Hyeon
(74) Attorney, Agent, or Firm—Timothy J. Aberle

(57) ABSTRACT

A fiber optic cable is provided that includes a plurality of lengthwise extending, non-jacketed bundles of optical fibers and a cable jacket surrounding the bundles of optical fibers. Each bundle of optical fibers may include a binder, such as a binder thread, for maintaining the integrity of the bundle. The binder may include, for example, a binder thread formed of an air entangled, textured, continuous multifilament thread. The fiber optic cable may also include a separation element for preventing adhesion between the bundles of optical fibers and the cable jacket without having to separately jacket each bundle of optical fibers.

56 Claims, 5 Drawing Sheets

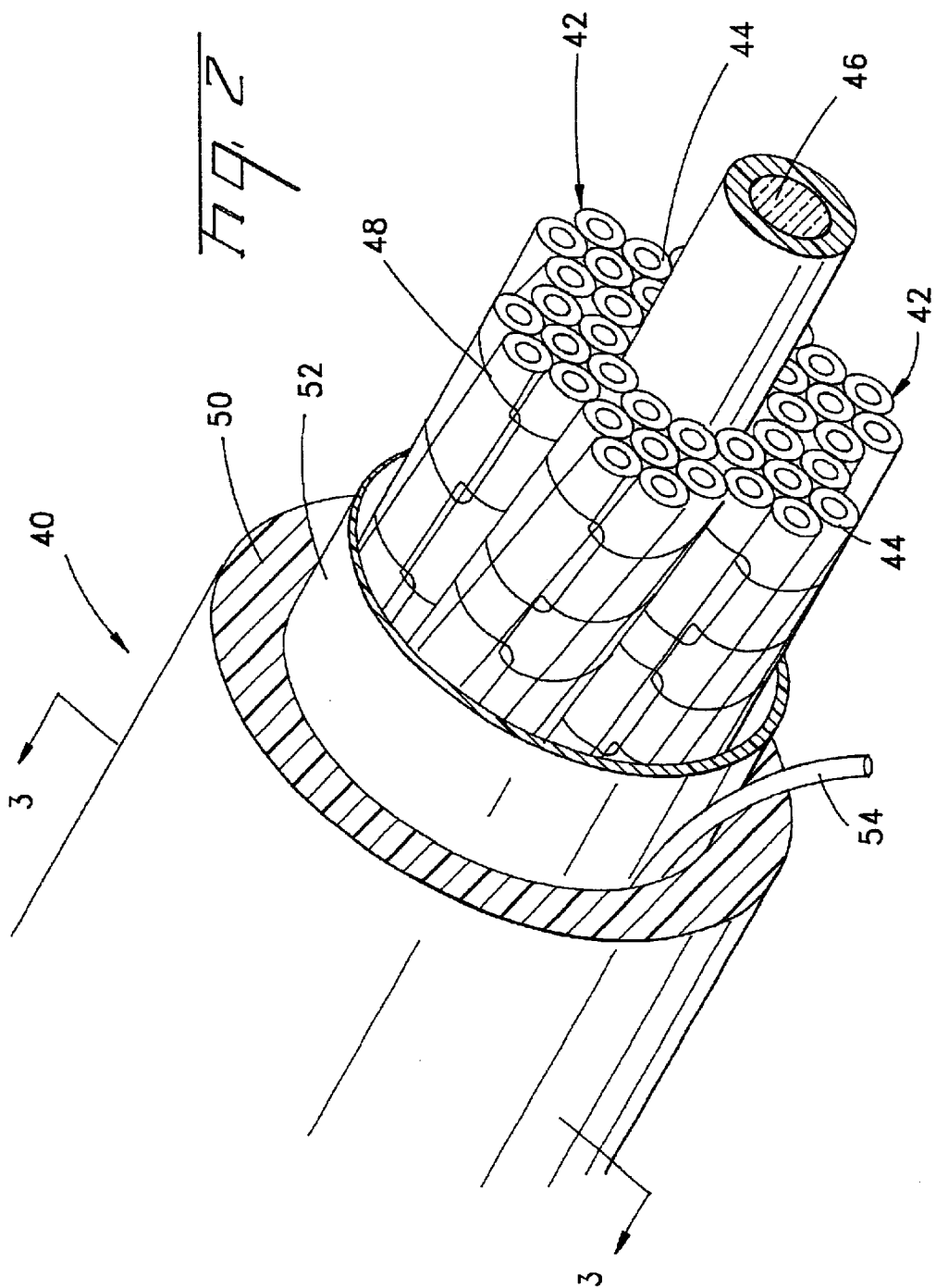

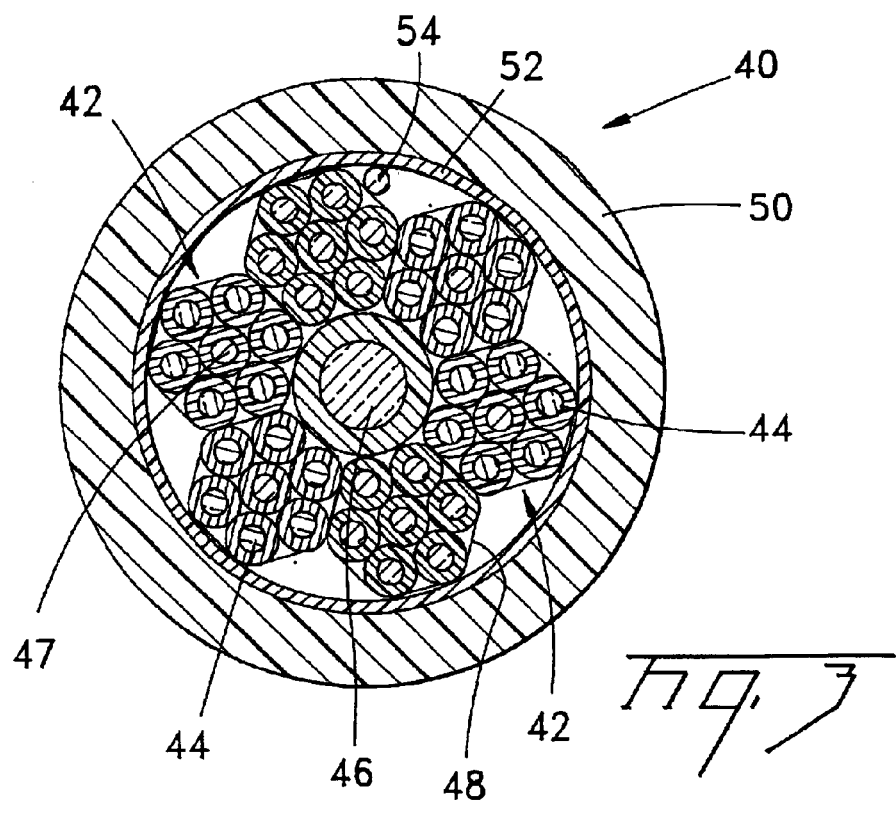
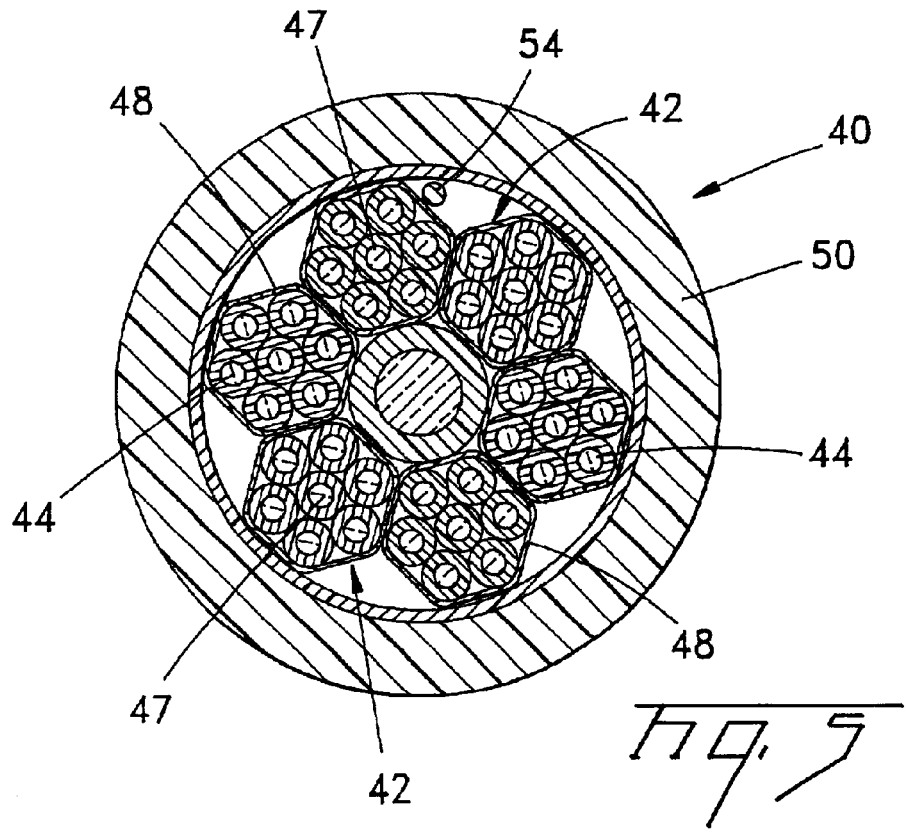

HIGH DENSITY FIBER OPTIC CABLE

FIELD OF THE INVENTION

The present invention relates generally to fiber optic cables and, more particularly, to high density fiber optic cables.

BACKGROUND OF THE INVENTION

In many applications, it is desirable for a fiber optic cable to include a plurality of optical fibers. With the increased demand for optical communications, there has been a corresponding demand to increase the number of optical fibers, i.e., the fiber count, of a fiber optic cable. By increasing the fiber count of a fiber optic cable, a single fiber optic cable would be able to support additional optical communications channels.

In order to increase the fiber count of fiber optic cables, unitized fiber optic cables have been developed. As shown in FIG. 1, a unitized fiber optic cable 10 includes a number of bundles 12 of optical fibers 14 that are stranded about a common central strength member 16. A unitized fiber optic cable 10 also includes a cable jacket 18 extruded about the bundles 12 of optical fibers 14, and an optional ripcord 22 for facilitating removal of cable jacket 18. As shown in FIG. 1, each bundle 12 of optical fibers 14 includes at least two and, more commonly, six or twelve optical fibers that are stranded together.

Optical fibers 14 are typically tight buffered optical fibers. A tight buffered optical fiber 14 includes a single mode or multi-mode optical fiber surrounded by an interfacial layer. The interfacial layer can be formed of a Teflon® containing material and is surrounded by a tight buffer layer. The tight buffer layer is typically formed of a plastic, such as polyvinyl chloride (PVC). As an alternative to PVC, the tight buffer layer can be formed of a non-halogenated polyolefin, such as a polyethylene or a polypropylene. Still further, the tight buffer layer can be formed of EVA, nylon or polyester.

Each bundle 12 of optical fibers 14 also generally includes a central strength member 26 about which the plurality of tight buffered optical fibers are stranded. Each bundle 12 of optical fibers 14 further includes a jacket 28 that surrounds the plurality of optical fibers, and an optional ripcord 20 for facilitating removal of jacket 28. Jacket 28 serves to protect optical fibers 14 and to maintain the bundle of optical fibers in a stranded relationship about central strength member 26. Jacket 28 is typically formed of a polymer, such as PVC. As an alternative to PVC, jacket 28 may be formed of a fluoro-plastic, such as polyvinylidene fluoride (PVDF), a fluoro-compound as disclosed by U.S. Pat. No. 4,963,609 or blends of PVC and PVDF or PVC and polyethylene (PE). Jacket 28 is typically relatively thick and, in one embodiment, has a thickness of about 0.8 millimeters.

During fabrication, a bundle 12 of optical fibers 14 is passed through an extruder cross head and jacket 28 is extruded thereabout in order to maintain the optical fibers in position within the bundle. Since the tight buffer layer of the tight buffered optical fibers 14 is typically formed of a plastic, the plastic that is extruded to form jacket 28 will tend to adhere to the tight buffer layer of the tight buffered optical fibers 14 in the absence of a barrier therebetween. In this regard, the plastic that is extruded to form jacket 28 of a bundle 12 of optical fibers 14 may partially melt the outermost portion of the tight buffer layer of the tight buffered optical fibers 14 such that jacket 28 and the tight buffered optical fibers will adhere to one another as the plastic cools.

Unfortunately, the adherence of the tight buffered optical fibers 14 to the surrounding jacket 28 generally decreases the performance of the optical fibers. In this regard, signals propagating along optical fibers 14 generally experience greater attenuation as fiber optic cable 10 is bent or flexed in instances in which the tight buffered optical fibers are adhered to jacket 28 since the optical fibers will no longer be free to move relative to jacket 28 in order to accommodate bending or flexure of fiber optic cable 10.

Each bundle 12 of optical fibers 14 therefore also generally includes a barrier 30 disposed between the plurality of tight buffered optical fibers and jacket 28 in order to separate the tight buffered optical fibers from jacket 28 and to prevent adherence therebetween that otherwise would result from the extension of jacket 28 about optical fibers 14. As such, optical fibers 14 can move somewhat relative to jacket 28 as fiber optic cable 10 is flexed. Barrier 30 is typically formed of a layer of strength members, such as aramid yarn, that are typically stranded about the optical fibers. The layer of strength members is also generally relatively thick and may have a thickness of about 0.2 mm in one embodiment.

Each bundle 12 of optical fibers 14 is typically stranded about common central strength member 16 of fiber optic cable 10. Like central strength member 26 of each bundle 12 of optical fibers 14, common central strength member 16 of fiber optic cable 10 is typically formed of a relatively stiff fiber or glass reinforced plastic, or a relatively flexible combination of aramid fibers that may or may not be overcoated with a plastic material. Fiber optic cable 10 also includes a protective cable jacket 18 that surrounds each of the bundles 12 of optical fibers 14. Cable jacket 18 is typically formed of a plastic, such as PVC. As an alternative to PVC, cable jacket 18 may be formed of a fluoro-plastic, such as PVDF, a fluoride-compound or blends of PVC and PVDF or PVC and PE.

As described above in conjunction with jacket 28 that surrounds each bundle 12 of optical fibers 14, cable jacket 18 is also typically extruded over the plurality of bundles of optical fibers. As a result of the plastic materials that form cable jacket 18 and the jackets 28 that surround the respective bundles 12 of optical fibers 14, cable jacket 18 and the jackets that surround the respective bundles of optical fibers may also adhere to one another following the extrusion of cable jacket 18 about the bundles of optical fibers. While the adherence of cable jacket 18 to the jackets 28 of the respective bundles 12 of optical fibers 14 does not impair the performance of fiber optic cable 10 as significantly as adherence between jacket 28 of a bundle 12 of optical fibers 14 and the tight buffer layer of the tight buffered optical fibers, the adherence of cable jacket 18 and the jackets of the respective bundles of optical fibers does disadvantageously impair the flexibility of fiber optic cable 10 somewhat.

Accordingly, fiber optic cable 10 can also include a surface coating on at least that portion of the exterior surface of jacket 28 of each bundle 12 of optical fibers 14 that otherwise would be in contact with cable jacket 18. The surface coating is typically formed of powdered talc that serves to prevent or reduce adhesion between cable jacket 18 and the jackets 28 of the respective bundles 12 of optical fibers 14.

Unitized fiber optic cable 10 as depicted in FIG. 1 is generally relatively large. For example, unitized fiber optic cable 10 depicted in FIG. 1 having six bundles 12 of optical fibers 14 stranded about a central strength member 16 with each bundle of optical fibers having six tight buffered optical fibers stranded about a respective strength member 26 generally has a diameter of about 18.8 millimeters. In many applications, it is desirable to minimize the size of fiber optic cable 10 while maintaining or increasing the number of optical fibers 14 within fiber optic cable 10. As such, it would be advantageous to develop a unitized fiber optic cable having a relatively high fiber count while also being somewhat smaller.

SUMMARY OF THE INVENTION

A fiber optic cable is provided according to one aspect of the present invention that includes at least one non-jacketed bundle of optical fibers having a plurality of optical fibers and at least one binder thread encircling the optical fibers to thereby maintain the integrity of the bundle of optical fibers without having to jacket each bundle of optical fibers. The fiber optic cable of this embodiment also includes a cable jacket surrounding the non-jacketed bundle of optical fibers. According to one embodiment, the binder thread is an air entangled, textured, continuous multi-filament thread having no more than 25 twists per inch. In addition, the binder thread may have a TEX number between 18 and 60 and a denier between 150 and 1000, may encircle the optical fibers with a pitch between 10 mm and 70 mm. Further, the binder thread may include a finish, such as a silicone wax emulsion finish, that is inert with respect to those components of the fiber optic cable with which the binder thread comes into contact.

The fiber optic cable according to another aspect of the present invention includes at least one tube assembly having an inner bundle of optical fibers, an outer non-jacketed bundle of optical fibers positioned circumferentially about the inner bundle of optical fibers, and a tubular member, such as a buffer tube, surrounding the outer non-jacketed bundle of optical fibers. Each bundle of optical fibers includes a plurality of optical fibers and at least one binder thread encircling the plurality of optical fibers to maintain the integrity of the respective bundle. Each optical fiber of the inner bundle includes indicia, such as an associated color, for uniquely identifying the respective optical fiber. Similarly, each optical fiber of the outer bundle includes indicia for uniquely identifying the respective optical fiber. Based upon the indicia of the optical fibers and the bundling of the optical fibers, each optical fiber of a respective tube assembly can therefore be uniquely identified.

A fiber optic cable is provided according to yet another aspect of the present invention that includes a central member, a plurality of non-jacketed bundles of optical fibers extending along the central member with each bundle of optical fibers including a plurality of optical fibers and a binder encircling the optical fibers to maintain the optical fibers in the bundle. The fiber optic cable of this embodiment also includes a cable jacket surrounding the bundles of optical fibers and a separation element for preventing adhesion between the bundles of optical fibers and the cable jacket without jacketing each bundle of optical fibers.

A fiber optic cable according to a further aspect of the present invention includes a plurality of non-jacketed bundles of optical fibers with each bundle including a plurality of optical fibers and a binder thread encircling the optical fibers to maintain the optical fibers in the bundle. The fiber optic cable of this embodiment also includes a separation layer surrounding the bundles of optical fibers and a cable jacket surrounding the separation layer. The separation layer prevents adhesion between the bundles of optical fibers and the cable jacket without having to separately jacket each bundle of optical fibers.

The fiber optic cable of the present invention therefore includes a relatively high count of optical fibers, while reducing the size or diameter of the fiber optic cable. In this regard, the fiber optic cable of the present invention preferably includes a plurality of bundles of optical fibers that are not separately jacketed, thereby permitting the diameter of the fiber optic cable to be reduced. However, the fiber optic cable of the present invention can include a binder, such as a binder thread, for maintaining the integrity of the respective bundles. Moreover, the fiber optic cable can include a separation element for preventing adhesion between the plurality of non-jacketed bundles of optical fibers and the cable jacket such that the optical fibers can move somewhat relative to the cable jacket as the fiber optic cable is bent or flexed such that the optical signals propagating along the optical fibers are not undesirably attenuated as a result of the flexure of the fiber optic cable.

BRIEF DESCRIPTION OF THE DRAWINGS

Figure 1:
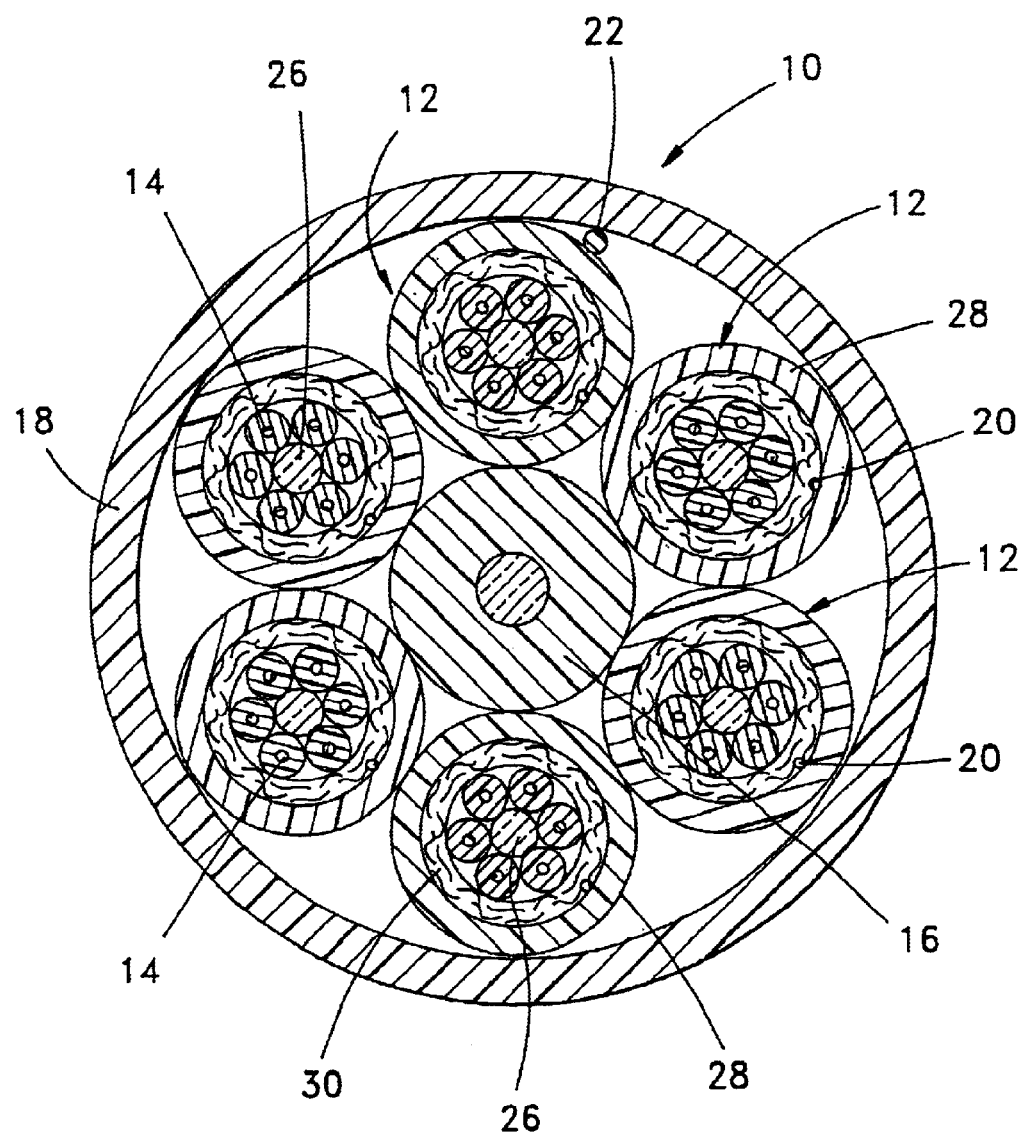
Figure 6:
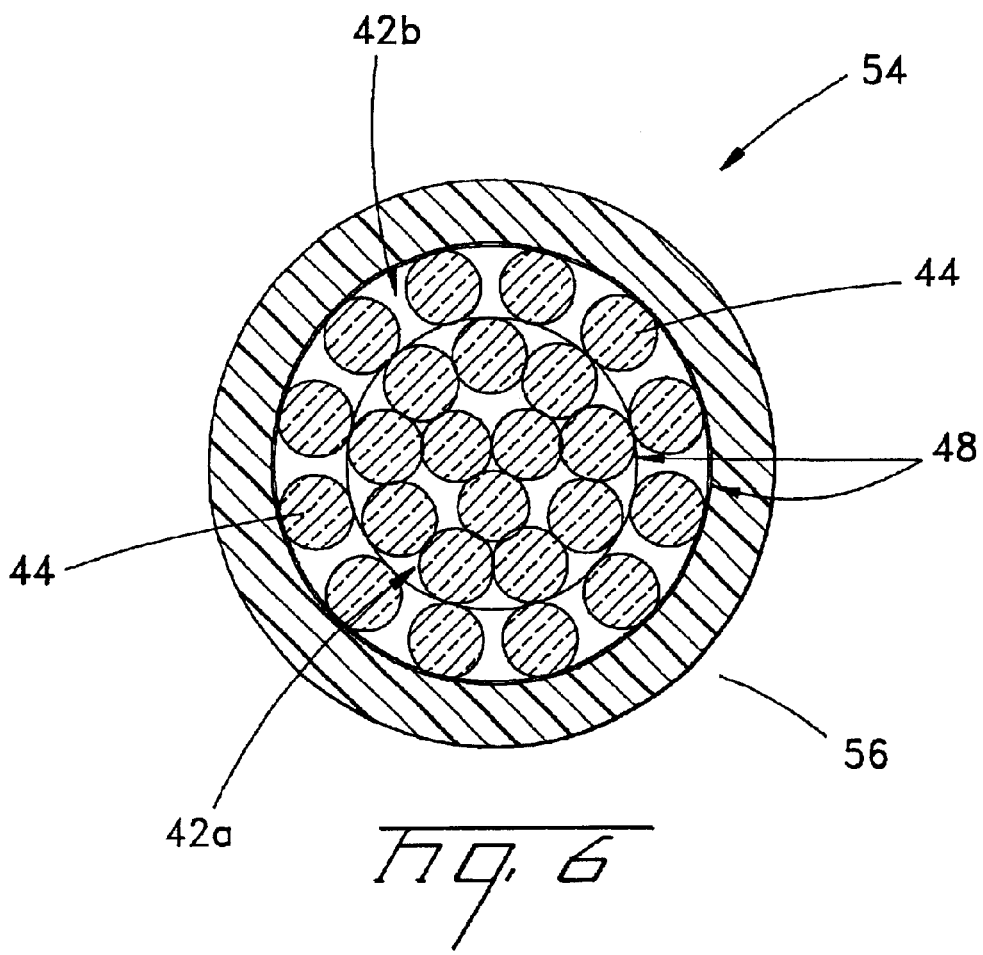
Figure 2A:
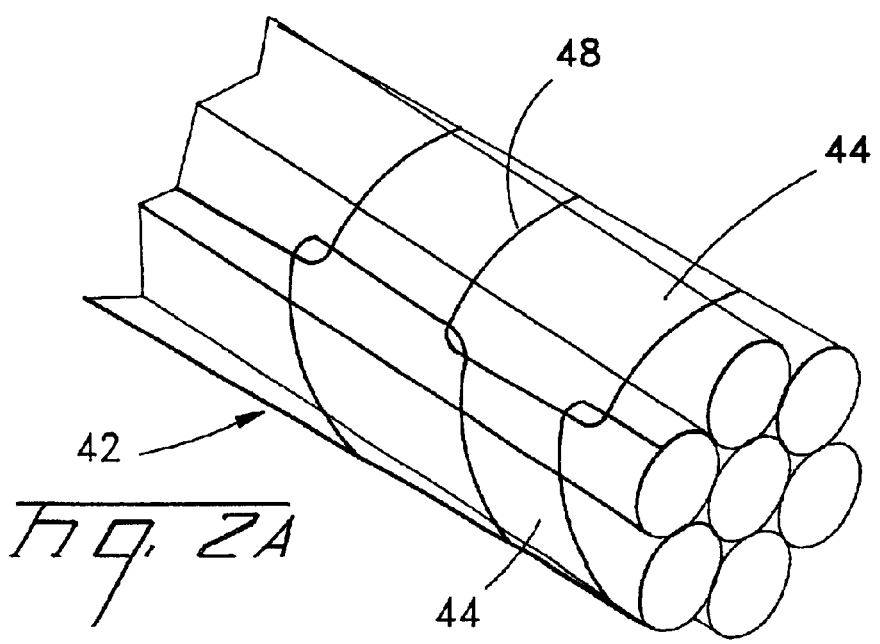
Figure 4:
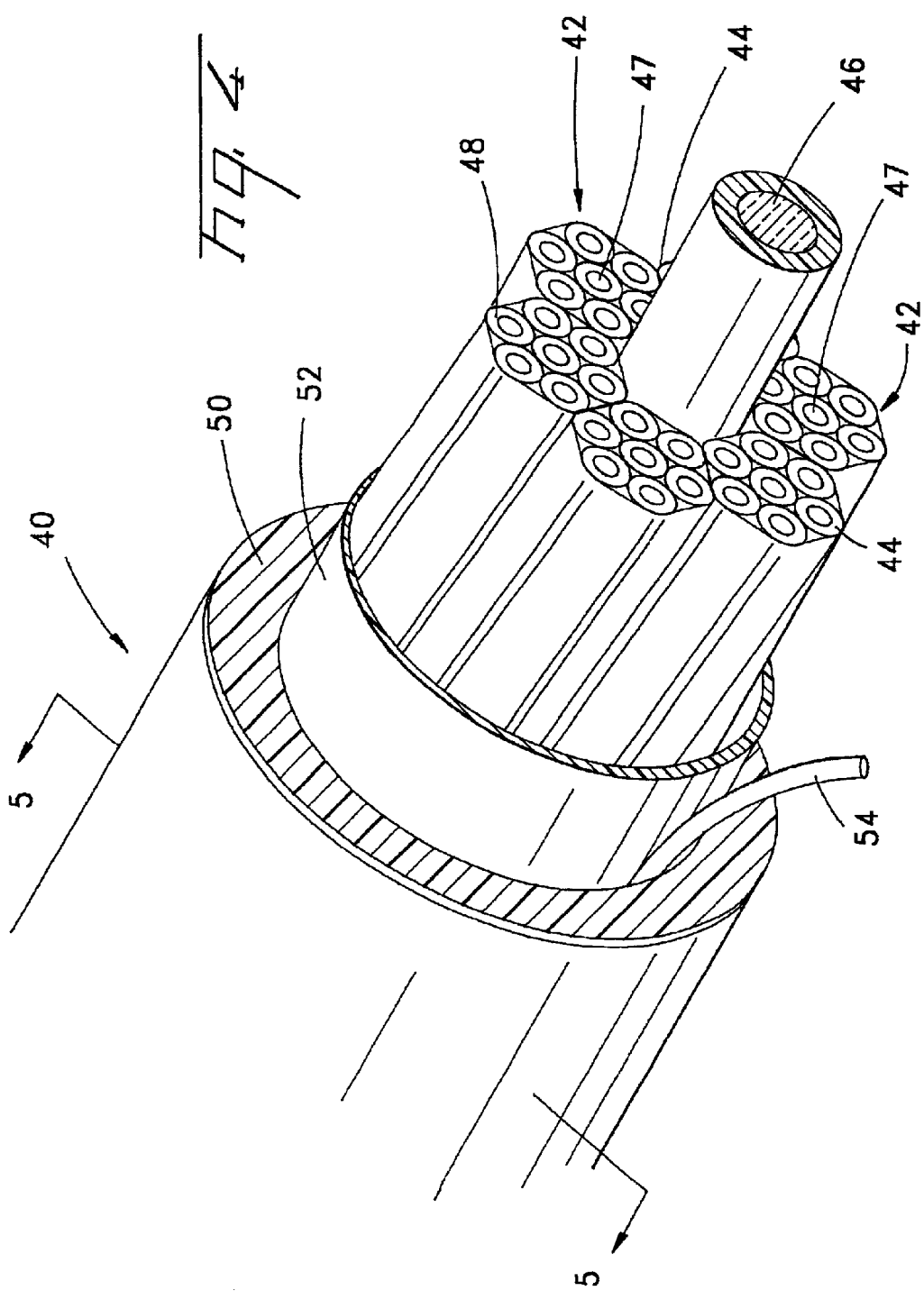

Having thus described the invention in general terms, reference will now be made to the accompanying drawings, which are not necessarily drawn to scale, and wherein:

FIG. 1 is a cross-sectional view of a conventional fiber optic cable having a unitized design;

FIG. 2 is a fragmentary perspective view of a fiber optic cable according to one embodiment of the present invention;

FIG. 2A is fragmentary perspective view of one bundle of optical fibers of the fiber optic cable of FIG. 2 which illustrates the binder thread in more detail;

FIG. 3 is a cross-sectional view of the fiber optic cable of FIG. 2 taken along line 3—3;

FIG. 4 is a fragmentary perspective view of a fiber optic cable according to another embodiment of the present invention;

FIG. 5 is a cross-sectional view of the fiber optic cable of FIG. 4 taken along line 5—5; and FIG. 6 is a cross-sectional view of a tube assembly of a fiber optic cable according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 2, a fiber optic cable 40 according to one embodiment of the present invention is illustrated. Fiber optic cable 40 of the present invention can have other configurations as described below, although the fiber optic cable of FIG. 2 will be described in more detail hereinbelow for purposes of illustration. Fiber optic cable 40 includes a plurality of bundles 42 of optical fibers 44. Typically, fiber optic cable 40 also includes a central strength member 46 along which the bundles 42 of optical fibers 44 extend or, more commonly, are stranded. Central strength member 46 can be formed of various materials including fiber or glass reinforced plastic, or a relatively flexible combination of aramid fibers that may or may not be overcoated with a plastic material. In the illustrated embodiment, however, a central strength member 46 formed of a plurality of aramid fibers overcoated with a plastic material is depicted.

In the illustrated embodiment, fiber optic cable 40 includes six bundles 42 of optical fibers 44. However, fiber optic cable 40 can include any number of bundles. Additionally, fiber optic cable 40 can include two or more layers of bundles 42, if so desired.

Each bundle 42 of optical fibers 44 includes a plurality of optical fibers. While each bundle can include any number of optical fibers, each bundle of optical fibers of fiber optic cable 40 generally includes the same number of optical fibers, such as six or twelve optical fibers. In addition, while the bundles 42 of the illustrated embodiment have a single layer of optical fibers 44, the bundles can include two or more layers of optical fibers, if so desired. Optical fibers 44 are generally tight buffered optical fibers including a conventional single mode or multi-mode optical fiber surrounded by an interfacial layer. The interfacial layer is generally formed of a Teflon® containing material. Each tight buffered optical fiber also includes a tight buffer layer that surrounds the interfacial layer. The interfacial layer therefore serves as a release layer that provides a controlled bond between the tight buffer layer and the optical fiber so that a craftsman can easily strip the tight buffer layer from the optical fiber during a termination procedure. The tight buffer layer is typically a plastic such as PVC. However, the tight buffer layer can be formed of other plastics including non-halogenated polyolefins, such as PE or polypropylene, a fluoro-plastic such as PVDF or a ultraviolet (UV) light curable material. Although not necessary for the practice of the present invention, the tight buffer layer can also be designed to be burn resistant and to have a riser, a plenum and/or a low smoke zero halogen rating as described by U.S. Pat. No. 6,167,178, the contents of which are incorporated herein by reference. For example, the tight buffer layer of the tight buffered optical fibers can include aluminum trihydrate, antimony trioxide or other additives to improve the burn resistance of the tight buffer layer.

Each bundle 42 of optical fibers 44 also includes a binder 48 that encircles the optical fibers to maintain optical fibers 44 in the bundle. In one advantageous embodiment depicted in FIGS. 2, 2A and 3, a binder thread 48 encircles the optical fibers 44. Fiber optic cable 40 can include various binder threads 48. Binder thread 48 is preferably an air-entangled, textured, continuous multi-filament thread. In addition, binder thread 48 is preferably a synthetic thread that is resistant or impervious to bacterial decomposition which would otherwise create hydrogen which, in turn, may cause undesirable increases in the attenuation of the signals transmitted via optical fibers 44. By way of example, binder thread 48 may be formed of polyester, rayon, nylon or the like. Moreover, binder thread 48 is preferably pre-shrunk.

Binder thread 48 advantageously has a large spread factor and therefore flattens once the binder thread is wrapped about optical fibers 44. Additionally, binder thread 48 preferably readily deforms when subjected to additional forces, such as the forces created by the bend in fiber optic cable 40. Binder thread 48 typically has no more than 25 twists per inch in order to avoid undesirable attenuation of the signals transmitted via optical fibers 44. Most commonly, binder thread 48 has between 2 twists per inch and 6 twists per inch and, more preferably, about 4 twists per inch. Binder thread 48 also preferably has a TEX number between 18 and 60 and, more preferably, between 30 and 40 such as about 35 in one embodiment such that the binder thread has a fluffy feel. Additionally, binder thread 48 advantageously has a denier between about 150 and about 1000 such as about 250 in one embodiment.

Binder thread 48 also preferably includes a finish that is inert with respect to the components of fiber optic cable 40 with which the binder thread will come into contact. In this regard, the finish of binder thread 48 is preferably inert with respect to the tight buffer layer of optical fibers 44, cable jacket 50 and any filling compound such as grease or the like. For example, binder thread 48 of one advantageous embodiment includes a silicone wax emulsion finish that facilitates processing of the binder thread. Binder thread 48 may also be designed to be non-wicking and/or can include a super-absorbent polymer in order to reduce or prevent water migration through fiber optic cable 40. Further, binder thread 48 can include indicia, such as an identification marking or a color, in order to identify the respective bundle of optical fibers encircled by the binder thread and to distinguish one bundle from another. Alternatively, central member 46 of each bundle 42 of optical fibers 44 can be color coded to uniquely identify the respective bundle.

Binder thread 48 is typically wrapped about a respective bundle 42 of optical fibers 44 in a helical manner with a pitch of between 10 mm and 70 mm and, more preferably, about 50 mm to facilitate fabrication of the bundle of the optical fibers. As illustrated in more detail in FIG. 2A, binder thread 48 of one advantageous embodiment includes a pair of threads, namely, a looper thread and a needle thread. As illustrated, one thread, which could be either the looper thread or the needle thread, alternately passes back and forth over the upper portion of bundle 42, while the other thread alternately passes back and forth under the lower portion of the bundle. With reference to the embodiment of FIG. 2A for purposes of example, the leftmost thread at the end of the bundle that is illustrated extends lengthwise along the bundle to a first stitch at which point the threads are secured by means of an overlooked stitch. The thread then helically encircles the lower portion of the bundle to a second overlooked stitch on the far side of the illustrated bundle at which point the threads are again secured to one another. The thread then extends lengthwise along the far side of the bundle to a third overlooked stitch before again helically encircling the lower portion of the bundle to a fourth overlooked stitch. This pattern is repeated for each thread along the length of the bundle in order to secure optical fibers 44 together in an integral manner. In this embodiment, the looper thread and the needle thread are typically secured to one another at a plurality of stitch locations along the length of the bundle of optical fibers, typically at a pitch of 10 mm to 70 mm and, more preferably, at a pitch of 50 mm, by means of an overlooked stitch. The resulting binder thread has a zig-zag appearance and is therefore sometimes termed a zig-zag binder. Binder thread 48 securely maintains the plurality of optical fibers 44 within bundle 42, while also maintaining the shape and size of the bundle of optical fibers such that the optical fibers need not be disposed within a respective jacket or buffer tube as required by conventional fiber optic cables. By eliminating the jacket or buffer tube in which a bundle of optical fibers were traditionally disposed, the resulting bundle of optical fibers and, in turn, fiber optic cable 40 can be reduced in size relative to a conventional fiber optic cable having the same number of optical fibers.

While a binder thread, such as those described above are advantageous for maintaining optical fibers 44 in a bundle 42, each bundle of optical fibers can include other types of binders, if so desired. For example, binder 48 may be formed of a film, such as a polymer film, that is wrapped about optical fibers 44 as depicted in FIG. 4. In contrast to the polymer jackets that surround the individual bundles of optical fibers of conventional unitized fiber optic cables, the polymer film is generally quite thin, such as between about 1 mil and 10 mils in one embodiment. Additionally, since the polymer film can be wrapped about the bundle 42 of optical fibers 44 and need not be extruded, the polymer film can be wrapped directly about the optical fibers and no barrier is required between the polymer film and the optical fibers since the polymer film will not adhere to the tight buffer layer of the tight buffered optical fibers in the same manner that an extruded polymeric jacket would adhere to the tight buffer layer of the tight buffered optical fibers of a conventional unitized fiber optic cable. Although the polymer film can be formed of various materials, the polymer film of one embodiment is formed of polyester, such as a polyethylene terephthalate, having a thickness of about 1 mil. For example, the polymer film may be a MYLAR® film.

Fiber optic cable 40 of the present invention also includes a cable jacket 50 that surrounds each of the bundles 42 of optical fibers 44, and an optional ripcord 54 for facilitating removal of cable jacket 50. Cable jacket 50 can be formed of various materials, but is typically formed of a plastic, such as PVC. As an alternative to the PVC, cable jacket 50 may be formed of other plastics including fiber-reinforced polyethylene (FRPE), a fluoro-plastic, such as PVDF, a fluoro-compound as disclosed by U.S. Pat. No. 4,963,609 or blends of PVC and PVDF or PVC and PE. As described above in conjunction with the tight buffer layer of the tight buffered optical fibers 44, cable jacket 50 can also be designed to have increased burn resistance such that the fiber optic cable has a riser, a plenum and/or a low smoke zero halogen rating. In this regard, cable jacket 50 can include aluminum trihydrate, antimony trioxide or other additives that increase the burn resistance of the cable jacket as known to those skilled in the art and as described by U.S. Pat. No. 6,167,178. Additionally, cable jacket 50 can be designed to be resistant to UV light, if so desired.

Cable jacket 50 is typically extruded about the plurality of bundles 42 of optical fibers 44. Since bundles 42 of optical fibers 44 need not be jacketed as described below, fiber optic cable 40 preferably includes a separation element 52 for preventing adhesion between the plurality of bundles of optical fibers and cable jacket 50. In one embodiment depicted in FIGS. 2 and 3, separation element 52 includes a separation layer disposed within cable jacket 50 and surrounding the plurality of bundles 42 of optical fibers 44. In this embodiment, separation layer 52 is preferably formed of a material having a melting point that is greater than the respective melting points of cable jacket 50 and the tight buffer layer of the tight buffered optical fibers 44 in order to prevent adherence between cable jacket 50 and the bundles of optical fibers. For a cable jacket 50 formed of PVC having a melting temperature of 190° C., separation layer 52 can be formed of a polyester, such as a MYLAR® film having a melting point of about 235° C.

Cable jacket 50 is typically extruded about the plurality of bundles 42 of optical fibers 44 at the melting temperature of the plastic that forms the cable jacket. By being formed of a material, such as a polyester, having a melting point greater than the melting point of the plastic that forms cable jacket 50, separation layer 52 does not melt as cable jacket 50 is extruded thereover. As such, separation layer 52 prevents adherence between cable jacket 50 and the bundles 42 of optical fibers 44 such that the optical fibers are able to move somewhat relative to cable jacket 50 as fiber optic cable 10 is flexed or bent, thereby permitting optical signals to be transmitted via the optical fibers without disadvantageous attenuation as fiber optic cable 10 is bent or flexed.

Separation layer 52 can be formed of other, non-polymeric materials, if so desired. For example, separation layer 52 can be formed of a water swellable tape in order to increase the water resistance of fiber optic cable 40. Alternatively, separation layer 52 can be formed of a plurality of strength elements, such as aramid yarns or fiberglass yarns, in order to increase the strength of fiber optic cable 40. The strength elements may have a parallel direction of lay relative to bundles 42 of optical fibers 44 or may be stranded about bundles 42, if desired. Still further, separation layer 52 can be formed of various other tapes, films, threads or fibrous materials. In each of these embodiments, however, separation layer 52 is designed to prevent adhesion between the plurality of bundles 42 of optical fibers 44 and cable jacket 50. Moreover, separation layer 52 of each of these embodiments is generally relatively thin so as not to unnecessarily increase the size of fiber optic cable 40. For a separation layer 52 formed of a MYLAR® film, for example, the mylar film may have a thickness of about 1 mil.

Separation element 52 can be formed in other manners, however, without departing from the spirit and scope of the present invention. For example, in the embodiment of fiber optic cable 40 depicted in FIGS. 4 and 5, each bundle 42 of optical fibers 44 includes a polymer film 48 surrounding the plurality of tight buffered optical fibers. By appropriately designing polymer film 48, polymer film 48 not only serves as the binder for the respective bundle 42 of optical fibers 44, but also serves as the separation element. In this regard, polymer film 48 is preferably formed of a material having a melting point greater than the melting point of the plastic that forms cable jacket 50. For example, for a fiber optic cable 40 having a cable jacket 50 formed of PVC having a melting point of 190° C., polymer film 48 can be formed of a polyester, such as a MYLAR® film, having a melting point of 235° C. As such, the polymer film 48 surrounding each bundle 42 of optical fibers 44 will not melt as cable jacket 50 is extruded about the plurality of bundles of optical fibers. Thus, polymer film 48 will serve to prevent adhesion between cable jacket 50 and the plurality of tight buffered optical fibers 44 of each bundle 42.

Still further, separation element 52 can be formed of a surface coating on each bundle 42 of optical fibers 44. In this regard, the surface coating is preferably applied to at least that portion of each bundle 42 of optical fibers 44 that would otherwise contact cable jacket 50. The surface coating is preferably formed of a material that also has a melting point greater than the melting point of the plastic from which cable jacket 50 is formed. For example, the surface coating may be formed of powdered talc that is applied to the outer surface of the plurality of bundles 42 of optical fibers 44. The surface coating of talc effectively prevents adhesion between cable jacket 50 and the tight buffered optical fibers 44 as the cable jacket is extruded thereover.

According to the present invention, each individual bundle 42 of optical fibers 44 is unjacketed. That is, each individual bundle 42 of optical fibers 44 is bound together by a binder 48, such as a binder thread, a thin polymeric layer or the like, and does not include a polymeric jacket as in conventional unitized fiber optic cables. As such, those embodiments of fiber optic cable 40 in which each bundle 42 is bound with a binder thread 48 permit direct contact between the tight buffered optical fibers of adjacent bundles.

Since each individual bundle 42 of optical fibers 44 does not include a jacket, each individual bundle of optical fibers also need not include a layer of strength members or the like that is otherwise disposed between the jacket and the tight buffered optical fibers in order to prevent adhesion between the jacket and the tight buffered optical fibers of conventional unitized fiber optic cables. As described above, the jackets surrounding the bundles of optical fibers of conventional unitized fiber optic cables are relatively thick. Likewise, the layer of strength members or the like disposed between the jacket of each individual bundle of optical fibers and the tight buffered optical fibers is also relatively thick. By designing fiber optic cable 40 such that the bundles 42 of optical fibers 44 need not include a polymeric jacket or a layer of strength members or the like for separating the tight buffered optical fibers from the polymeric jacket, each bundle of optical fibers can be substantially reduced in size and, correspondingly, fiber optic cable 40 can be substantially reduced in size.

For comparison purposes, fiber optic cable 40 according to one embodiment of the present invention has six bundles 42 of optical fibers 44 with each bundle of optical fibers including six tight buffered optical fibers stranded about a central strength member 46. While the size and thickness of various cable components may be varied depending upon the application, such as by varying the thickness of cable jacket 50 to alter the crush and impact resistance and/or the flame retardance, fiber optic cable 40 of one embodiment also includes a separation layer 52 of a polyester, such as a MYLAR® film surrounding the bundles 42 of optical fibers 44 and a cable jacket 50 having a thickness of 1.3 millimeters surrounding the separation layer such that fiber optic cable 40 has a total diameter of 10.9 millimeters. As described above, a conventional unitized fiber optic cable having the same number of bundles and the same number of total optical fibers generally has a diameter that is substantially larger, such as 18.8 millimeters. As such, the conventional fiber optic cable has a cross-sectional area that is about three times larger than the fiber optic cable according to the foregoing exemplary embodiment. Thus, fiber optic cable 40 of the present invention can include the same number of optical fibers 44 while being much smaller than conventional fiber optic cables. Alternatively, fiber optic cable 40 can include a greater number of optical fibers, i.e., a higher fiber count, while having the same size as a conventional fiber optic cable.

While various embodiments of fiber optic cable 40 have been described above, fiber optic cable 40 can include other features without departing from the spirit and scope of the present invention. For example, fiber optic cable 40 can be constructed to have increased water resistance by including a variety of water swellable tapes, threads and/or powders. For example, separation layer 52 can be formed of a water swellable tape as described above.

While one unitized design of fiber optic cable 40 has been described hereinabove, fiber optic cable 40 may have other configurations. In this regard, the embodiment of fiber optic cable 40 depicted in FIGS. 2–5 includes a plurality of individual bundles of optical fibers extending along central member 46 and surrounded by cable jacket 50. In order to further increase the fiber count of fiber optic cable 40, however, fiber optic cable 40 can include a number of tube assemblies extending along the central member and surrounded by cable jacket 50 with each tube assembly including multiple bundles of optical fiber. In order to minimize the size of each tube assembly required to contain a predetermined number of optical fibers, however, each bundle of optical fibers of a tube assembly is preferably non-jacketed as described above in conjunction with the embodiment of FIGS. 2–5.

While the bundles of optical fibers may be arranged in various manners, each tube assembly 54 of fiber optic cable 40 can include concentric bundles 42 of optical fibers 44 with some bundles of optical fibers within other bundles of optical fibers as depicted in the embodiment of FIG. 6. In this regard, tube assembly 54 depicted in FIG. 6 includes an inner bundle 42a of optical fibers 44. Inner bundle 42a includes a plurality of optical fibers 44 and at least one binder thread 48 encircling the plurality of optical fibers to maintain the integrity of the bundle. Although not illustrated, inner bundle 42a may also include a central strength member along which optical fibers 44 extend, if so desired. Inner bundle 42a can include any number of optical fibers 44, but typically includes 6 or 12 optical fibers. Each optical fiber of inner bundle 42a preferably includes indicia, such as a color, for uniquely identifying the respective optical fiber relative to other optical fibers of the inner bundle. While inner bundle 42a may include various binder threads, binder thread 48 of one advantageous embodiment is an air entangled, textured, continuous multi-filament thread as described above in more detail.

Tube assembly 54 of the embodiment depicted in FIG. 6 also includes an outer bundle 42b of optical fibers 44 having a plurality of optical fibers positioned circumferentially about the inner bundle 42a of optical fibers. While outer bundle 42b may include any number of optical fibers, the outer bundle of the illustrated embodiment includes 12 optical fibers. Like inner bundle 42a, each optical fiber 44 of outer bundle 42b also preferably includes indicia, such as a color, for uniquely identifying the respective optical fiber relative to other optical fibers of the outer bundle. While each optical fiber 44 of inner bundle 42a and each optical fiber of the outer bundle 42b is uniquely identified, such as by having a unique color, with respect to other optical fibers of the respective bundle, optical fibers of inner bundle 42a may have the same colors as optical fibers of outer bundle 42b. However, optical fibers 44 of the inner and outer bundles that have the same color may be distinguished from one another based upon the respective bundle in which the optical fibers are included. Outer bundle 42b of optical fibers also includes at least one binder thread 48 encircling the plurality of optical fibers to maintain the integrity of the optical fibers of the outer bundle about inner bundle 42a. While inner bundle 42a may include various binder threads, binder thread 48 of one advantageous embodiment is also an air entangled, textured, continuous multi-filament thread as described above in more detail.

Additionally, tube assembly 54 of FIG. 6 can include a tubular member 56, such as a buffer tube, surrounding outer bundle 42b of optical fibers 44 as described above. Moreover, any voids within tubular member 54 may be filled with a filling compound, such as grease or the like, to prevent water migration.

As depicted in FIG. 6, at least the outer bundle 42b of optical fibers 44 and, more preferably, both the outer and inner bundles of optical fibers are non-jacketed such that the cross-sectional size of the resulting tube assembly 54 can be minimized for a predetermined number of optical fibers. In order to prevent adhesion between tubular member 54 and outer bundle 42b of optical fibers 44, tube assembly 54 of FIG. 6 can also include a separation element, such as a separation layer that surrounds the outer bundle of optical fibers or a surface coating on the outer bundle of optical fibers, as described above.

By encircling inner bundle 42a with optical fibers 44 of outer bundle 42b, tube assembly 54 of the embodiment of FIG. 6 will include a dense collection of optical fibers in order to maximize the number of optical fibers included within a buffer tube of a particular cross-sectional size.

However, each optical fiber of tube assembly 54 can be uniquely identified by means of the indicia, such as the color, of each optical fiber and the separation of the optical fibers into inner and outer bundles.

In order to construct fiber optic cable 40 utilizing tube assembly 54 depicted in FIG. 6, a plurality of tube assemblies are extended alongside a central member 46, typically by being stranded about central member 46, in the same manner as the individual bundles 42 of optical fibers 44 are extended along central member 46 in the embodiment of FIGS. 2–5. A cable jacket 50 is then extruded over the plurality of tube assemblies 54. To prevent adhesion between tubular members 56 of tube assemblies 54 and cable jacket 50, fiber optic cable 40 can also include a separation element disposed between tube assemblies 54 and cable jacket 50 as described above in conjunction with the other embodiments. By including tube assemblies, each of which generally include multiple bundles of optical fibers, fiber optic cable 40 of this embodiment can include even greater numbers of optical fibers, such as 288 optical fibers or more, while continuing to minimize the overall cross-sectional size of the cable. However, each optical fiber 44 of fiber optic cable 40 of this embodiment may be uniquely identified since tubular member 56 of each tube assembly 54 may include indicia, such as a color, to uniquely identify the respective tube assembly and the indicia, such as the color, of each optical fiber and the separation of the optical fibers into inner and outer bundles permit each optical fiber of a respective tube assembly to be uniquely identified as described above.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. The optical fibers can be grouped with a binder thread as described above and then covered with a layer of strength filaments, for example, aramid fibers and/or fiberglass, which is then covered by a thermoplastic jacket material.

That which is claimed:

1. A fiber optic cable comprising:
   at least one non-jacketed bundle of optical fibers, each bundle of optical fibers comprising & plurality of optical fibers and at least one preshrunk binder thread encircling the plurality of optical fibers to thereby maintain the plurality of optical fibers in the bundle, said at least one preshrunk binder thread comprising an air entangled, textured, continuous multi-filament thread having no more than 25 twists per inch; and
   a cable jacket surrounding said at least one non-jacketed bundle of optical fibers.

2. A fiber optic cable according to claim 1 wherein said at least one preshrunk binder thread comprises a looper thread and a needle thread that cooperate to encircle the plurality of optical fibers.

3. A fiber optic cable according to claim 2 wherein said looper thread and said needle thread are secured to one another by a plurality of overlocked stitches.

4. A fiber optic cable according to claim 1 wherein said at least one preshrunk binder thread is formed of a synthetic thread that is resistant to bacterial decomposition.

5. A fiber optic cable according to claim 4 wherein said at least one preshrunk binder thread is formed of preshrunk polyester.

6. A fiber optic cable according to claim 1 wherein said at least one preshrunk binder thread has a finish that is inert with respect to those components of the fiber optic cable with which said at least one preshrunk binder thread comes into contact.

7. A fiber optic cable according to claim 6 wherein the finish is a silicone wax emulsion finish.

8. A fiber optic cable according to claim 1 wherein said at least one preshrunk binder thread has between 2 twists and 6 twists per inch.

9. A fiber optic cable according to claim 1 wherein said at least one preshrunk binder thread has a TEX number between 18 and 60.

10. A fiber optic cable according to claim 9 wherein said at least one preshrunk binder thread has a TEX number between 30 and 40.

11. A fiber optic cable according to claim 1 wherein said at least one preshrunk binder thread has a denier between 150 and 1000.

12. A fiber optic cable according to claim 11 wherein said at least one preshrunk binder thread has a denier of 250.

13. A fiber optic cable according to claim 1 wherein said at least one preshrunk binder thread is resistant to wicking.

14. A fiber optic cable according to claim 1 wherein said at least one preshrunk binder thread includes a super absorbant polymer.

15. A fiber optic cable according to claim 1 wherein said at least one preshrunk binder thread comprises indicia for uniquely identifying said bundle of optical fibers.

16. A fiber optic cable according to claim 1 wherein said at least one preshrunk binder thread encircles the plurality of optical fibers with a pitch between 10 mm and 70 mm.

17. A fiber optic cable according to claim 16 wherein said at least one preshrunk binder thread encircles the plurality of optical fibers with a pitch of 50 mm.

18. A fiber optic cable according to claim 1 further comprising a separation element for preventing adhesion between said at least one non-jacketed bundle of optical fibers and said cable jacket.

19. A fiber optic cable according to claim 18 wherein said separation element comprises a separation layer disposed within said cable jacket and surrounding said at least one non-jacketed bundle of optical fibers.

20. A fiber optic cable according to claim 18 wherein said separation element comprises a surface coating on said at least one non-jacketed bundle of optical fibers.

21. A fiber optic cable comprising:
   at least one non-jacketed bundle of optical fibers, each bundle of optical fibers comprising a plurality of optical fibers and at least one binder thread encircling the plurality of optical fibers to thereby maintain the plurality of optical fibers in the bundle, said at least one binder thread having a silicone wax emulsion finish; and
   a cable jacket surrounding said at least one non-jacketed bundle of optical fibers.

22. A fiber optic cable according to claim 21 wherein said at least one binder thread comprises an air entangled, textured, continuous multi-filament thread.

23. A fiber optic cable according to claim 21 wherein said at least one binder thread comprises a looper thread and a needle thread that cooperate to encircle the plurality of optical fibers.

24. A fiber optic cable according to claim 23 wherein said looper thread and said needle thread are secured to one another by a plurality of overlocked stitches.

25. A fiber optic cable according to claim 21 wherein said at least one binder thread is formed of a synthetic thread that is resistant to bacterial decomposition.

26. A fiber optic cable according to claim 25 wherein said at least one binder thread is formed of preshrunk polyester.

27. A fiber optic cable according to claim 21 wherein said at least one binder thread has no more than 25 twists per inch.

28. A fiber optic cable according to claim 27 wherein said at least one binder thread has between 2 twists and 6 twists per inch.

29. A fiber optic cable according to claim 21 wherein said at least one binder thread has a TEX number between 18 and 60.

30. A fiber optic cable according to claim 29 wherein said at least one binder thread has a TEX number between 30 and 40.

31. A fiber optic cable according to claim 21 wherein said at least one binder thread has a denier between 150 and 1000.

32. A fiber optic cable according to claim 31 wherein said at least one binder thread has a denier of 250.

33. A fiber optic cable according to claim 21 wherein said at least one binder thread is resistant to wicking.

34. A fiber optic cable according to claim 21 wherein said at least one binder thread includes a super absorbent polymer.

35. A fiber optic cable according to claim 21 wherein said at least one binder thread comprises indicia for uniquely identifying said bundle of optical fibers.

36. A fiber optic cable according to claim 21 wherein said at least one binder thread encircles the plurality of optical fibers with a pitch between 10 mm and 70 mm.

37. A fiber optic cable according to claim 36 wherein said at least one binder thread encircles the plurality of optical fibers with a pitch of 50 mm.

38. A fiber optic cable according to claim 21 further comprising a separation element for preventing adhesion between said at least one non-jacketed bundle of optical fibers and said cable jacket.

39. A fiber optic cable according to claim 38 wherein said separation element comprises a separation layer disposed within said cable jacket and surrounding said at least one non-jacketed bundle of optical fibers.

40. A fiber optic cable according to claim 38 wherein said separation element comprises a surface coating on said at Least one non-jacketed bundle of optical fibers.

41. A fiber optic cable comprising:
at least one bundle of optical fibers, each bundle of optical fibers comprising a plurality of optical fibers and at least one binder thread encircling the plurality of optical fibers with a pitch between 10 mm and 70 mm to thereby maintain the plurality of optical fibers in the bundle, said at least one binder thread comprising an air entangled, textured, continuous multi-filament thread having no more than 25 twists per inch, a TEX number between 18 and 60 and a denier between 150 and 1000, said at least one binder thread also including a finish that is inert with respect to those components of the fiber optic cable with which said at least one binder thread comes into contact; and a cable jacket surrounding said at least one bundle of optical fibers, a layer of strength members being generally interposed between said thread and said cable jacket.

42. A fiber optic cable according to claim 41 wherein said at least one binder thread comprises a looper thread and a needle thread that cooperate to encircle the plurality of optical fibers.

43. A fiber optic cable according to claim 42 wherein said looper thread and said needle thread are secured to one another by a plurality of overlocked stitches.

44. A fiber optic cable according to claim 41 wherein said at least one binder thread is formed of a synthetic thread that is resistant to bacterial decomposition.

45. A fiber optic cable according to claim 44 wherein said at least one binder thread is formed of preshrunk polyester.

46. A fiber optic cable according to claim 41 wherein the finish is a silicone wax emulsion finish.

47. A fiber optic cable according to claim 41 wherein said at least one binder thread has between 2 twists and 6 twists per inch.

48. A fiber optic cable according to claim 41 wherein said at least one binder thread has a TEX number between 30 and 40.

49. A fiber optic cable according to claim 41 wherein said at least one binder thread has a denier of 250.

50. A fiber optic cable according to claim 41 wherein said at least one binder thread is resistant to wicking.

51. A fiber optic cable according to claim 41 wherein said at least one binder thread includes a super absorbant polymer.

52. A fiber optic cable according to claim 41 wherein said at least one binder thread comprises indicia for uniquely identifying said bundle of optical fibers.

53. A fiber optic cable according to claim 41 wherein said at least one binder thread encircles the plurality of optical fibers with a pitch of 50 mm.

54. A fiber optic cable according to claim 41 further comprising a separation element for preventing adhesion between said at least one bundle of optical fibers and said cable jacket.

55. A fiber optic cable according to claim 54 wherein said separation element comprises a separation layer disposed within said cable jacket and surrounding said at least one bundle of optical fibers.

56. A fiber optic cable according to claim 54 wherein said separation element comprises a surface coating on said at least one non-jacketed bundle of optical fibers.

* * * * *